United States Patent
Chakkera et al.

(10) Patent No.: US 6,786,039 B2
(45) Date of Patent: Sep. 7, 2004

(54) THRUST REVERSER ACTUATOR WITH AN AUTOMATIC RELOCK AND LOCK DROP PREVENTION MECHANISM

(75) Inventors: Kevin K. Chakkera, Chandler, AZ (US); Donald J. Christensen, Phoenix, AZ (US); Andrew T. Johnson, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 14 days.

(21) Appl. No.: 10/233,752

(22) Filed: Sep. 3, 2002

(65) Prior Publication Data

US 2003/0066284 A1 Apr. 10, 2003

Related U.S. Application Data (63) Continuation-in-part of application No. 09/949,431, filed on Sep. 7, 2001, now Pat. No. 6,487,846.

(51) Int. Cl.$^7$ .............................. F02K 1/70; F02K 1/76
(52) U.S. Cl. ............ 60/226.2; 244/110 B; 239/265.29; 239/265.31
(58) Field of Search ............................... 60/226.2, 230; 244/110 B; 239/265.19, 265.25, 265.27, 265.29, 265.31

(56) References Cited

U.S. PATENT DOCUMENTS

| | | |
|---|---|---|
| 2,191,137 A | 2/1940 | Trible |
| 2,746,583 A | 5/1956 | Blevins |
| 3,056,624 A | 10/1962 | Nardone |
| 3,621,763 A | 11/1971 | Geyer |
| 3,659,686 A | 5/1972 | Markle |
| 4,149,430 A | 4/1979 | Geppert |
| 4,491,059 A * | 1/1985 | Martin ......................... 92/5 L |
| 4,543,783 A | 10/1985 | Greiine et al. |
| 4,561,527 A | 12/1985 | Nakamoto et al. |
| 4,586,329 A | 5/1986 | Carlin |
| 4,987,788 A | 1/1991 | Bausch |
| 5,365,210 A | 11/1994 | Hines |
| 5,431,085 A * | 7/1995 | Geffray ......................... 91/44 |
| 5,448,884 A | 9/1995 | Repp |
| 5,609,020 A * | 3/1997 | Jackson et al. ............. 60/226.2 |
| 5,960,626 A * | 10/1999 | Baudu et al. ............... 60/226.2 |
| 6,042,053 A * | 3/2000 | Sternberger et al. ..... 244/110 B |
| 6,138,449 A * | 10/2000 | Hudson ........................ 60/223 |
| 6,487,846 B1 * | 12/2002 | Chakkera et al. ........... 60/226.2 |
| 6,625,973 B1 * | 9/2003 | Langford et al. .......... 60/226.2 |

FOREIGN PATENT DOCUMENTS

| | | |
|---|---|---|
| EP | 0743 443 A1 | 11/1996 |
| EP | 0997 630 A2 | 5/2000 |
| WO | PCT/US03/27514 | 12/2003 |

OTHER PUBLICATIONS

PCT International Search Report PCT/US03/27514.

* cited by examiner

*Primary Examiner*—Ted Kim
(74) *Attorney, Agent, or Firm*—Douglas A. Mullen, Esq.

(57) ABSTRACT

A thrust reverser system includes one or more actuators each having a locking mechanism that prevents unintended actuator movement, and thus unintended thrust reverser movement. Each of the actuators additionally includes a lock inhibitor assembly that engages the lock and prevents it from moving to its locked position until the actuator is moved into a stow position. Upon movement to the stow position, the lock inhibitor assembly disengages the lock, and the lock automatically moves into its locked position.

26 Claims, 8 Drawing Sheets

THRUST REVERSER ACTUATOR WITH AN AUTOMATIC RELOCK AND LOCK DROP PREVENTION MECHANISM

CROSS-REFERENCE TO RELATED APPLICATIONS

This application is a continuation-in-part (CIP) of U.S. application Ser. No. 09/949,431 filed Sep. 7, 2001, now U.S. Pat. No. 6,487,846.

FIELD OF THE INVENTION

The present invention relates to a jet engine thrust reverser system and, more particularly, to a thrust reverser system that includes actuators having an automatic relock and lock drop prevention mechanism.

BACKGROUND OF THE INVENTION

When jet-powered aircraft land, the landing gear brakes and imposed aerodynamic drag loads (e.g., flaps, spoilers, etc.) of the aircraft may not be sufficient to slow the aircraft down in the required amount of runway distance. Thus, jet engines on most aircraft include thrust reversers to enhance the stopping power of the aircraft. When deployed, thrust reversers redirect the rearward thrust of the jet engine to a forward direction to decelerate the aircraft. Because the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the stopping power of the aircraft, thereby shortening the stopping distance during landing. Hence, thrust reversers are primarily deployed during the landing process to slow the aircraft. Thereafter, when the thrust reversers are no longer needed, they are returned to their original, or stowed, position and are locked.

The thrust reversers in each of the above-described designs are moved between the stowed and deployed positions by means of actuators. One or more of these actuators may include a locking device to prevent unintended thrust reverser movement. Current thrust reverser systems incorporate the locking devices as separate units that may attach to one or more components of the thrust reverser system. For example, U.S. Pat. No. 4,586,329 (the '329 patent) discloses a locking device that is coupled to the gear shafts that couple the thrust reverser system actuators together. In another example, U.S. Pat. No. 5,448,884 (the '884 patent) discloses a locking device that is attached to a thrust reverser actuator. While these locking devices are generally safe, they tend to be complex and heavy for certain applications, and have a system inertia and size envelope that is not compatible with certain applications. In addition, neither of these patents discloses automatically moving the locking devices to a locked position when the actuator is moved to the stowed position, nor the inhibition of actuator locking when the actuator is unlocked and it is not in the stowed position. Drawbacks also can be associated with the power sources for these locks.

Hence, there is a need for a thrust reverser actuator locking device that improves upon one or more of the above-noted drawbacks. Namely, a locking device that is not complex or heavy as compared to known locks, and/or does not significantly increase actuator system size and/or weight, and/or automatically relocks the actuator upon thrust reverser stowage, and/or inhibits actuator locking when it is unlocked and is not in the stowed position. The present invention satisfies one or more of these needs.

SUMMARY OF THE INVENTION

The present invention relates to a system for moving thrust reversers that includes a plurality of actuators each having an integrated locking mechanism that prevents unintended actuator movement, and thus unintended thrust reverser movement, that automatically relocks the actuator upon stowage, and that inhibits unintentional locking until the thrust reverser is stowed.

In one embodiment, and by way of example only, a system for moving a thrust reverser includes at least one power source, at least two drive mechanisms, and at least two actuator assemblies. Each actuator assembly is coupled to at least one of the drive mechanisms and is operable to move, upon receipt of the driving force, between a stowed position and a deployed position. At least one of the actuator assemblies includes a housing, a drive shaft, an actuator, a lock assembly, and a lock inhibitor assembly. The drive shaft is rotationally mounted within the housing, and has a gear portion, a lock portion, and a first end adapted to couple to at least one of the drive mechanisms. The actuator extends from the housing and has a drive gear mounted to engage the gear portion of the drive shaft. The lock assembly is movably mounted on the housing and is selectively operable to move between a locked and an unlocked position, whereby the lock assembly engages and disengages the drive shaft lock portion in the locked and unlocked position, respectively, to thereby prevent and allow rotation thereof, respectively. The lock inhibitor assembly is mounted on the housing and is selectively operable to move between an engaged and a disengaged position, whereby the lock inhibitor engages the lock assembly in the engaged position to thereby prevent movement thereof to the locked position.

In another exemplary embodiment, a thrust reverser actuator with an integrated lock for use in a system having at least one drive mechanism for moving a thrust reverser between deployed and stowed positions includes a housing, a drive shaft, an actuator, a lock assembly, and a lock inhibitor assembly. The drive shaft is rotationally mounted within the housing, and has a gear portion, a lock portion, and a first end adapted to couple to at least one of the drive mechanisms. The actuator extends from the housing and has a drive gear mounted to engage the gear portion of the drive shaft. The lock assembly is movably mounted on the housing and is selectively operable to move between a locked and an unlocked position, whereby the lock assembly engages and disengages the drive shaft lock portion in the locked and unlocked position, respectively, to thereby prevent and allow rotation thereof, respectively. The lock inhibitor assembly is mounted on the housing and is selectively operable to move between an engaged and a disengaged position, whereby the lock inhibitor engages the lock assembly in the engaged position to thereby prevent movement thereof to the locked position.

In still another exemplary embodiment, a thrust reverser lock assembly for use in a system having at least one drive mechanism for moving a thrust reverser between deployed and stowed position includes a lock assembly and a lock and a lock inhibitor assembly. The lock is selectively operable to move between a locked and an unlocked position, respectively, to thereby prevent and allow rotation of each drive mechanism, respectively. The lock inhibitor assembly is selectively operable to move between an engaged and a disengaged position, whereby the lock inhibitor engages the lock assembly in the engaged position to thereby prevent movement thereof to the locked position.

In yet still another exemplary embodiment, in a jet engine thrust reverser system including at least one actuator assembly that moves in a stow and a deploy direction and having a lock that is moveable between a locked and an unlocked position, to thereby allow and prevent movement of the actuator assembly in the deploy direction, respectively, a method of operating the actuator assembly includes moving the lock to the unlocked position. The lock is physically engaged to prevent its movement to the locked position. The actuator is moved in the deploy direction and in the stow direction. The physical engagement of the lock is removed upon the actuator reaching a substantially fully stowed position, whereby the lock automatically moves to the locked position.

Other independent features and advantages of the preferred system and actuator will become apparent from the following detailed description, taken in conjunction with the accompanying drawings which illustrate, by way of example, the principles of the invention.

DETAILED DESCRIPTION OF THE PREFERRED EMBODIMENTS

Before proceeding with the detailed description of the invention, it is to be appreciated that the described embodiment is not limited to use in conjunction with a specific thrust reverser system design. Thus, although the embodiment is explicitly described as being implemented in a cascade-type thrust reverser system in which transcowls are used as the moveable thrust reverser component, it should be appreciated that it can be implemented in other thrust reverser system designs, including those described above and those known in the art.

Figure 1:
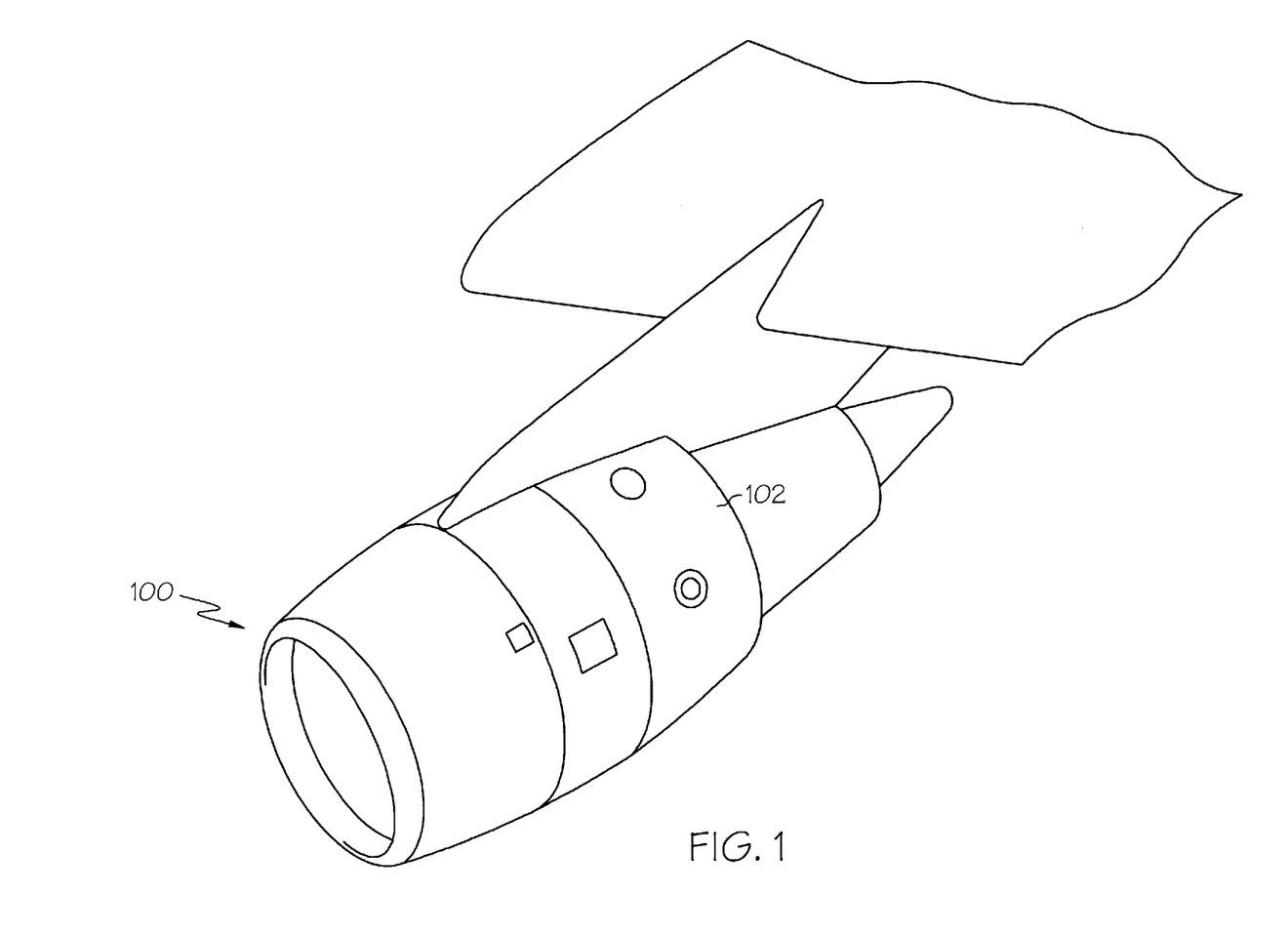
FIG. 1 is a perspective view of an aircraft engine.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 that are positioned circumferentially on the outside of the fan case 100.

Figure 2:
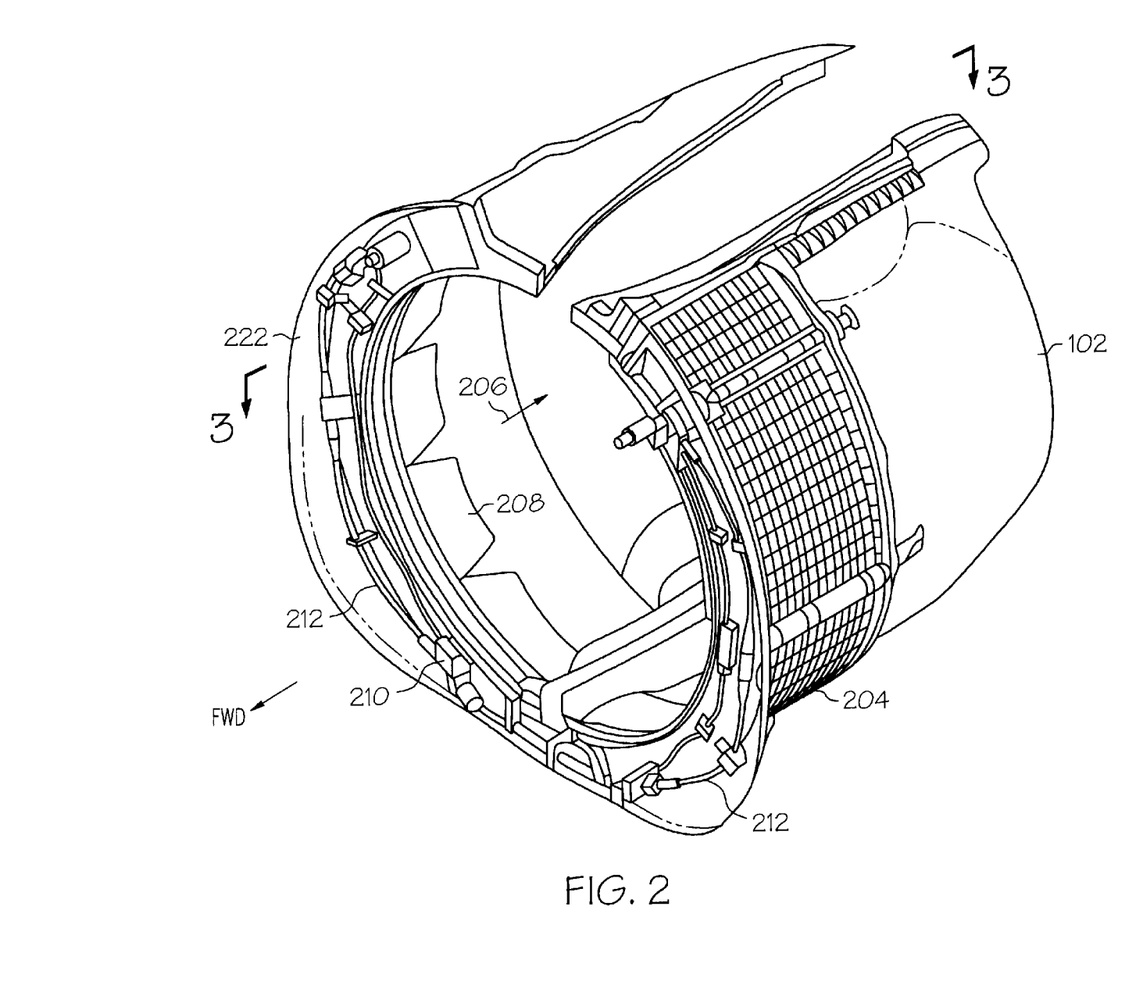
FIG. 2 is a perspective view of portions of an engine fan cowl and thrust reverser system utilized with the engine of FIG. 1.
Figure 3:
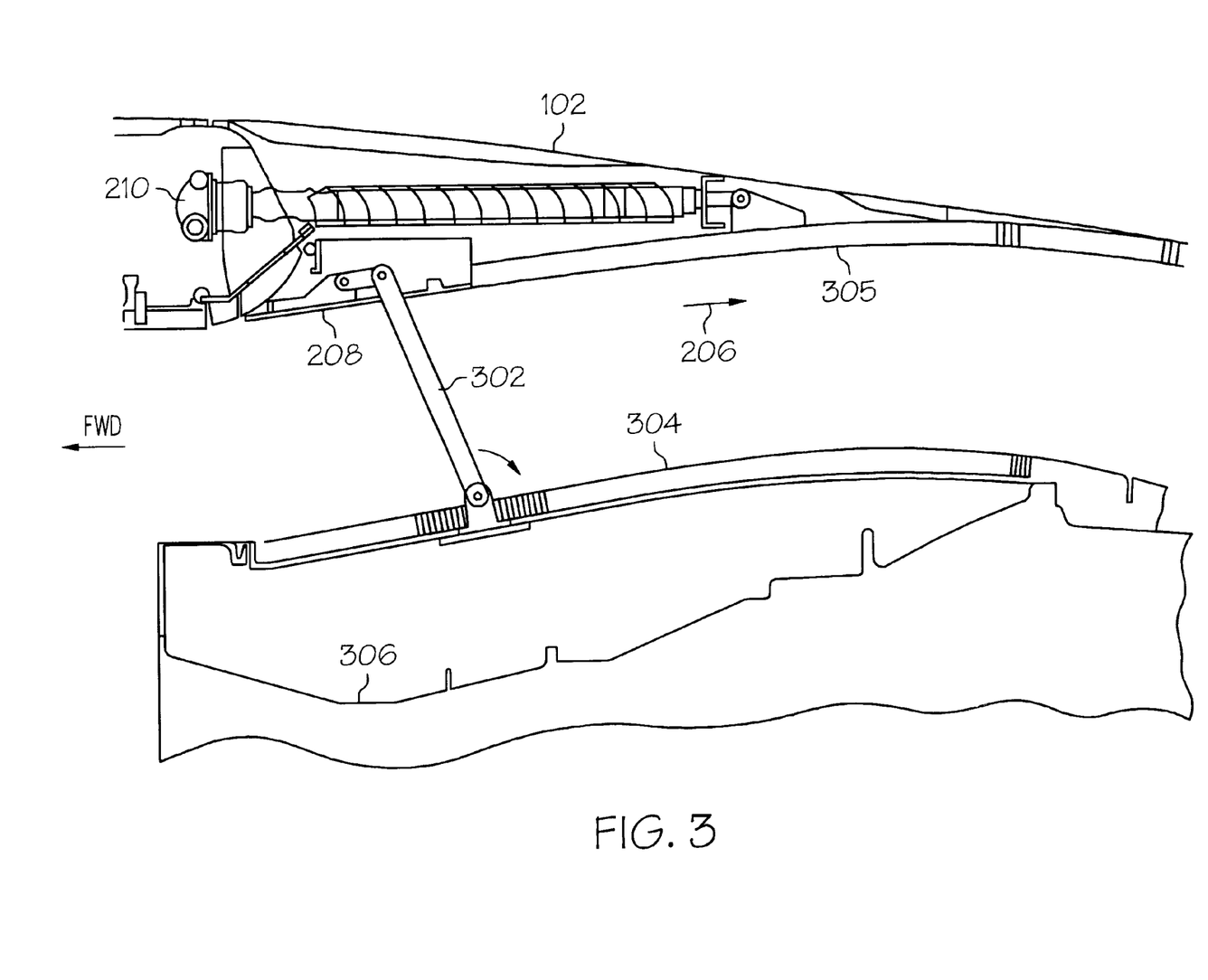
FIG. 3 is a partial cross section view taken along line 3—3 of FIG. 2.
Figure 4:
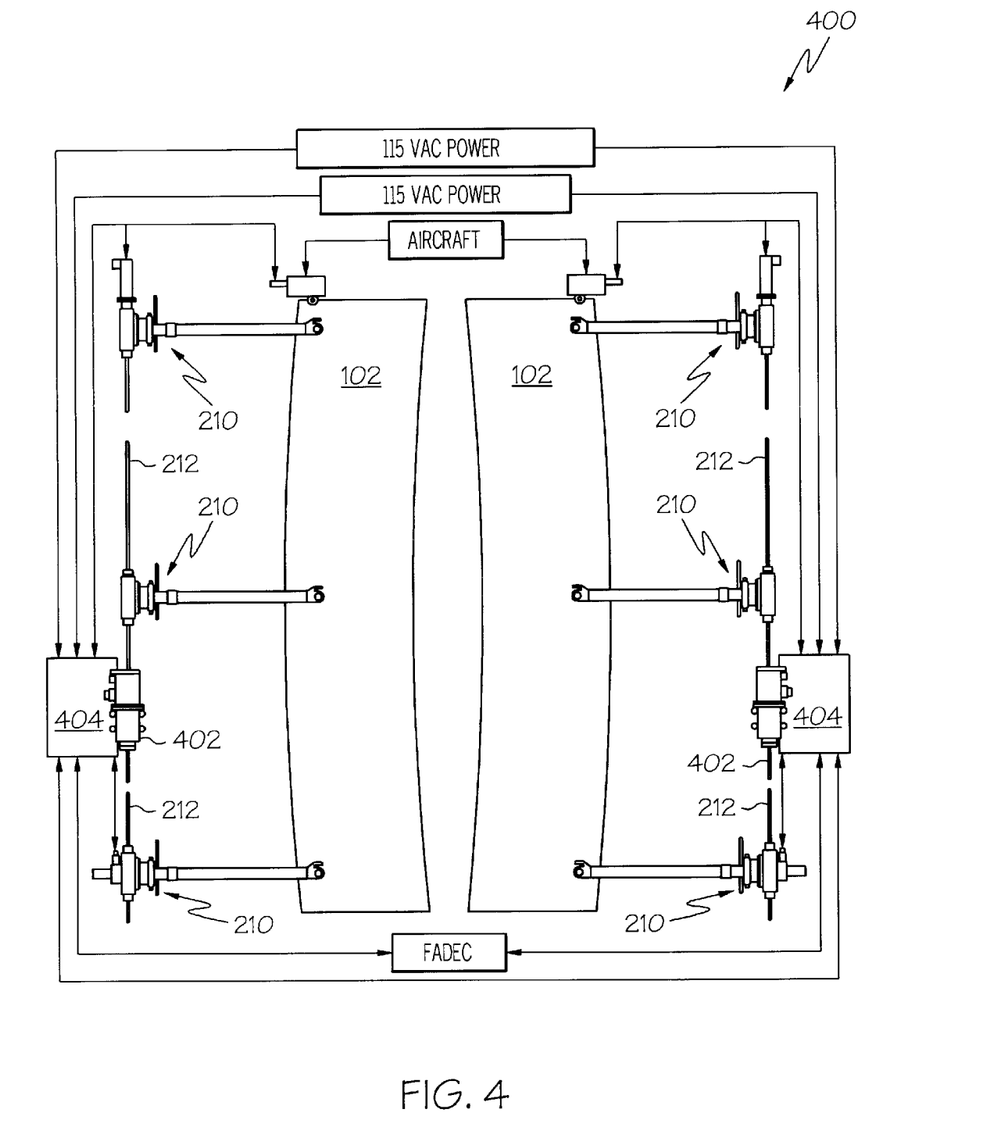
FIG. 4 is a simplified functional schematic representation of an exemplary thrust reverser actuation control system according to an embodiment of the present invention.

As shown more particularly in FIGS. 2, 3, and 4, the transcowls 102 cover a plurality of cascade vanes 204, which are positioned between the transcowls 102 and a bypass air flow path 206. A series of blocker doors 208 are mechanically linked to the transcowls 102 via a drag link 302 that is rotatably connected to a wall 304 that surrounds the engine case 306. In the stowed position, the blocker doors 208 form a portion of an outer wall 305 and are therefore oriented parallel to a bypass air flow path 206. When the thrust reversers are commanded to deploy, the transcowls 102 are translated aft, causing the blocker doors 208 to rotate into a deployed position, such that the bypass air flow path 206 is blocked. This also causes the cascade vanes 204 to be exposed and the bypass air flow to be redirected out the cascade vanes 204. The redirection of the bypass air flow in a forward direction creates a reverse thrust and, thus, works to slow the airplane.

One or more actuator assemblies 210 per engine are used to operate the transcowls 102. The actuator assemblies 210 are mounted to, for example, a stationary torque box 222 and are coupled to the transcowls 102. It is noted that the actuator assemblies 210 may be any one of numerous actuator designs known in the art. However, in this embodiment the actuator assemblies 210 are ballscrew actuators. It is additionally noted that the number and arrangement of actuator assemblies 210 is not limited to what is depicted in FIG. 2, but could include other numbers of actuator assemblies 210 as well. The number and arrangement of actuators is selected to meet the specific design requirements of the system.

The actuator assemblies 210 are interconnected via a plurality of drive mechanisms 212, each of which, in the particular depicted embodiment, comprises a flexible shaft. The drive mechanisms 212 ensure that the actuator assemblies 210, and thus the transcowls 102, move in a substantially synchronized manner. For example, when one transcowl 102 is moved, another transcowl 102 is moved a like distance at substantially the same time. Other drive mechanisms that may be used include gears, or any other mechanism or design that transfers power between the actuator assemblies 210.

A control system controls movement of the transcowls 102 from a locked and stowed position to an unlocked and deployed position for producing reverse thrust, and returns the transcowls 102 from the deployed position back to the stowed and locked position. A simplified functional schematic representation of an exemplary thrust reverser actuation control system is depicted in FIG. 4. The control system 400 includes the actuator assemblies 210, each coupled to a transcowl 102, and interconnected by the drive mechanisms 212. Each of actuator assemblies 210 is driven by one or more power sources. The one or more power sources may be a hydraulic power source, a pneumatic power source, or an electric power source. In a preferred embodiment, the power source is electric and, more specifically, is an electric motor 402 that is controlled by a controller circuit 404. As will be discussed in more detail below, one or more of the actuator assemblies 210 includes an integral locking mechanism that prevents unintended movement of the transcowls 102 from the stowed position, and that is automatically relocked upon stowage of the thrust reversers.

Figure 5:
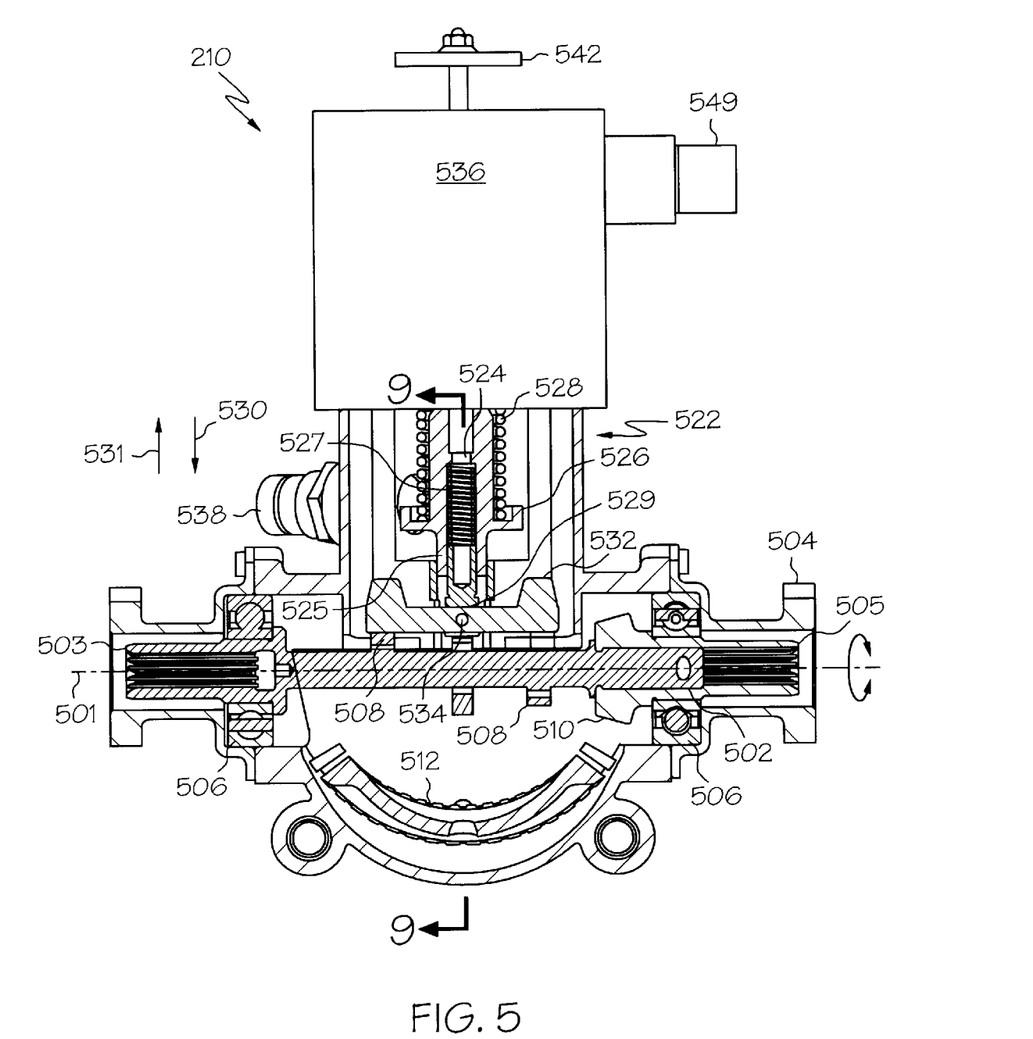
FIG. 5 is a cross section view of a first embodiment an actuator that may be used in the thrust reverser actuation system depicted in FIG. 4.

With reference now to the remaining figures, a detailed description of various embodiments of an actuator assembly 210 will be provided. As previously noted, it is to be appreciated that although the actuator assemblies 210 depicted and described herein are ballscrew type actuators, the actuator assemblies 210 encompass other types of actuator designs. Turning first to FIG. 5, which depicts a cross section view of an exemplary actuator assembly 210, a detailed discussion of a particular embodiment will now be provided. The actuator assembly 210 includes a drive shaft 502 rotationally mounted within a housing 504 by bearing elements 506, such that the drive shaft 502 rotates about an axis of rotation 501. The draft shaft 502 has first 503 and second 505 ends that are adapted to couple the drive shaft 502 to one or more drive mechanisms 212 when the actuator assembly 210 is installed in a thrust reverser system. The drive shaft 502 includes one or more protrusions 508 extending from its outer surface. The purpose of the protrusions 508 will be discussed in more detail below. The drive shaft 502 further includes gearing 510 that meshes with a bevel gear 512, the purpose of which is described more fully below.

The actuator assembly 210 also includes a locking device 522 that is mounted on, or within, the housing 504. The locking device 522 includes a rod 524 coupled to a piston assembly 525. A target assembly 526 surrounds the rod 524 and abuts an end of the piston assembly 525. The target assembly 526 includes a biasing element 528, such as a spring, that biases the piston assembly 525 and rod 524 toward a first position (indicated by directional arrow 530). Preferably, the rod 524 and piston assembly 525 are configured such that their longitudinal axes are normal to the axis of rotation 501 of the drive shaft 502. A locking bar 532 is pivotally mounted proximate a first end of the piston assembly 525 using a pin 534, such that its longitudinal axis is perpendicular to that of the rod 524, and substantially coplanar with the drive shaft's axis of rotation 501. The piston assembly 525 is "spring-loaded," meaning it includes a spring 527 that is biased against the internal surface of the piston assembly 525. An end surface 529 of the piston assembly 525 that contacts the locking bar 532 is slightly tapered. This structure ensures that the locking bar 532, when in the first position 530, will pivot and, if the drive shaft 502 includes more than one protrusion 508, will also ensure that the locking bar 532 engages at least one of the protrusions 508 even if the other end of the locking bar 532 is on top of another protrusion 508. Thus, as will be discussed further below, the locking bar 532, when in the first position 530, prevents rotation of the drive shaft 502 in a first rotational direction.

A solenoid assembly 536 is mounted on the housing 504 and is coupled to the rod 524. In a preferred embodiment, the solenoid 536 is biased toward the first, locked position 530, and is energized to move the locking device 522 toward a second, unlocked position 531. An input receptacle 549 is coupled to receive an input signal of appropriate polarity from external equipment such as, for example, the actuator control system controller circuit 404, to selectively energize the solenoid assembly 536 and move the locking device 522 to the unlocked position 531.

When the actuator assembly 210 is installed in a thrust reverser system, it is desirable that the position of the locking device 522 be known to the pilots or maintenance personnel. Thus, a position sensor 538 is also mounted to the housing 504. The position sensor 538, which may be one of any numerous sensors known in the art such as, for example, an optical sensor, a magnetic proximity sensor, or a limit switch, supplies an electrical signal to the controller circuit 404 that is representative of the position of the locking device 522. In this way, the actuator control system 400 is aware when the locking device 522 is in the first, locked position 530 and the second, unlocked position 531.

The actuator assemblies 210 may need to undergo period preventive, and sometimes corrective, maintenance. Many of the procedures associated with these maintenance activities require that the actuator assembly 210 be unlocked, when there is no power available to the solenoid assembly 536. Hence, to accommodate such maintenance procedures, a manual release mechanism 542 is provided. The manual release mechanism 542, when operated, moves piston assembly 525 and thus the rod 524 and locking bar 532, against the force of the biasing spring 528 into the second, unlocked position 531. With the drive shaft 502 unlocked, it is free to be rotated in both the first and second rotational directions, as required for maintenance purposes.

Figure 6:
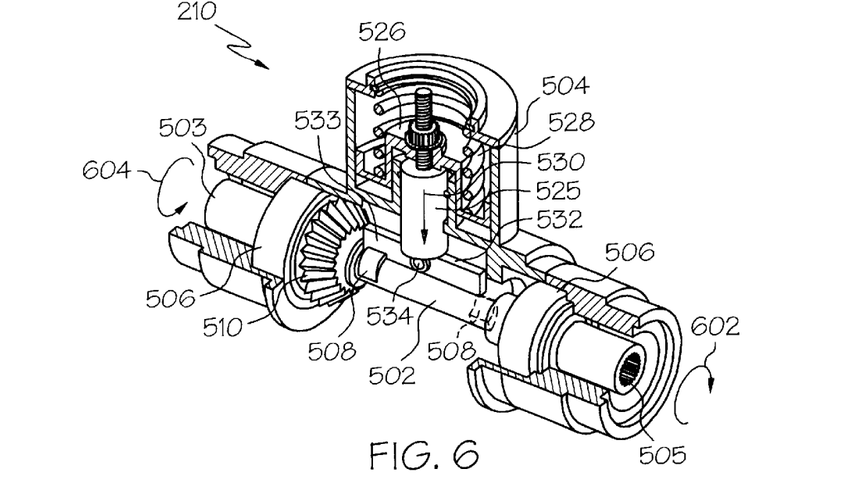
FIG. 6 is a partial cut-away cross section view of portions' of the actuator shown in FIG. 5, the actuator in a locked condition.
Figure 7:
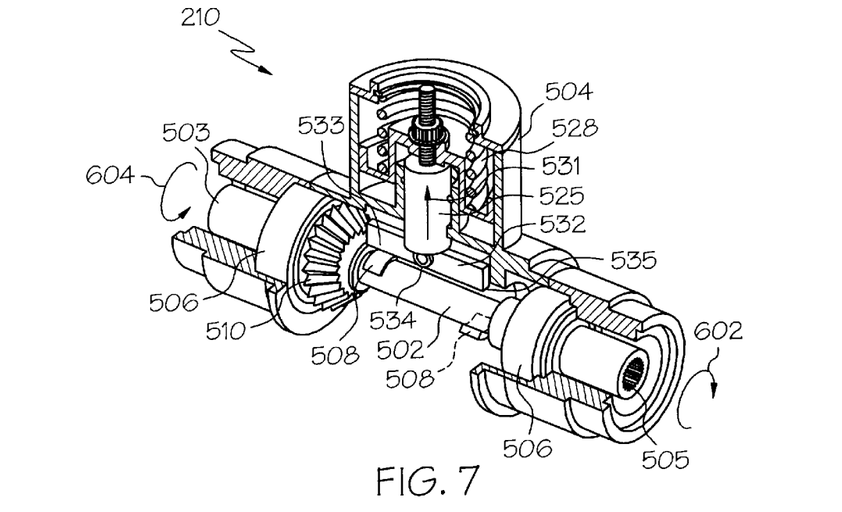
FIG. 7 is a partial cut-away cross section view of portions of the actuator shown in FIG. 5, depicting the actuator in an unlocked condition.
Figure 8:
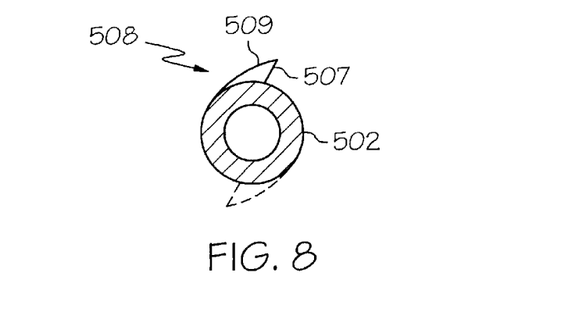
FIG. 8 is a cross section view of a drive shaft taken along line 8—8 in FIG. 7.

When the locking device 522 is in the first, locked position 530, the drive shaft 502 is prevented from rotating in a first rotational direction but is allowed to rotate in a second rotational direction. Alternatively, when the locking device 522 is in the second, unlocked position 531, the drive shaft 502 is allowed to rotate in both the first and second rotational directions. With reference to FIGS. 6, 7, and 8, in which like parts to those previously described are given like reference numerals, the structural features that provide this functionality will now be discussed. Referring first to FIGS. 6 and 7, which depict partial cut-away perspective views of selected portions of the actuator assembly 210 in locked and unlocked conditions, respectively, it is seen that when the rod 524, the piston assembly 525, and locking bar 532 are in the first, locked position 530 (FIG. 6), the protrusions 508 extending from the drive shaft 502 prevent the drive shaft 502 from rotating in the first rotational direction 602, while simultaneously allowing the drive shaft 502 to be rotated in the second rotational direction 604. Conversely, when the rod 524, the piston assembly 525, and locking bar 532 are in the second, unlocked position 531 (FIG. 7), the drive shaft 502 is free to be rotated in both the first 602 and second 604 rotational directions.

As can be seen more explicitly in FIG. 8, each protrusion 508 includes a stop surface 507 and a tapered surface 509.

The stop surface 507 on each protrusion 508 faces in the first rotational direction 602. With this configuration, when the rod 524 and locking bar 532 are in the first position, at least one of the stop surfaces 507 fixedly abuts against a side surface 533 of the locking bar 532, preventing rotation of the drive shaft 502 in the first rotational direction 602. The tapered surface 509 on each protrusion 508 extends gradually from the surface of the drive shaft 502 to the top of the stop surfaces 507. Since the locking bar 532 is pivotally mounted to the piston assembly 525, when the piston assembly 525 and locking bar 532 are in the first position 530, a bottom surface 535 of the locking bar 532 will be able to slide over the tapered surfaces 509 if the drive shaft 502 is rotated in the second rotational direction 604.

Figure 9:
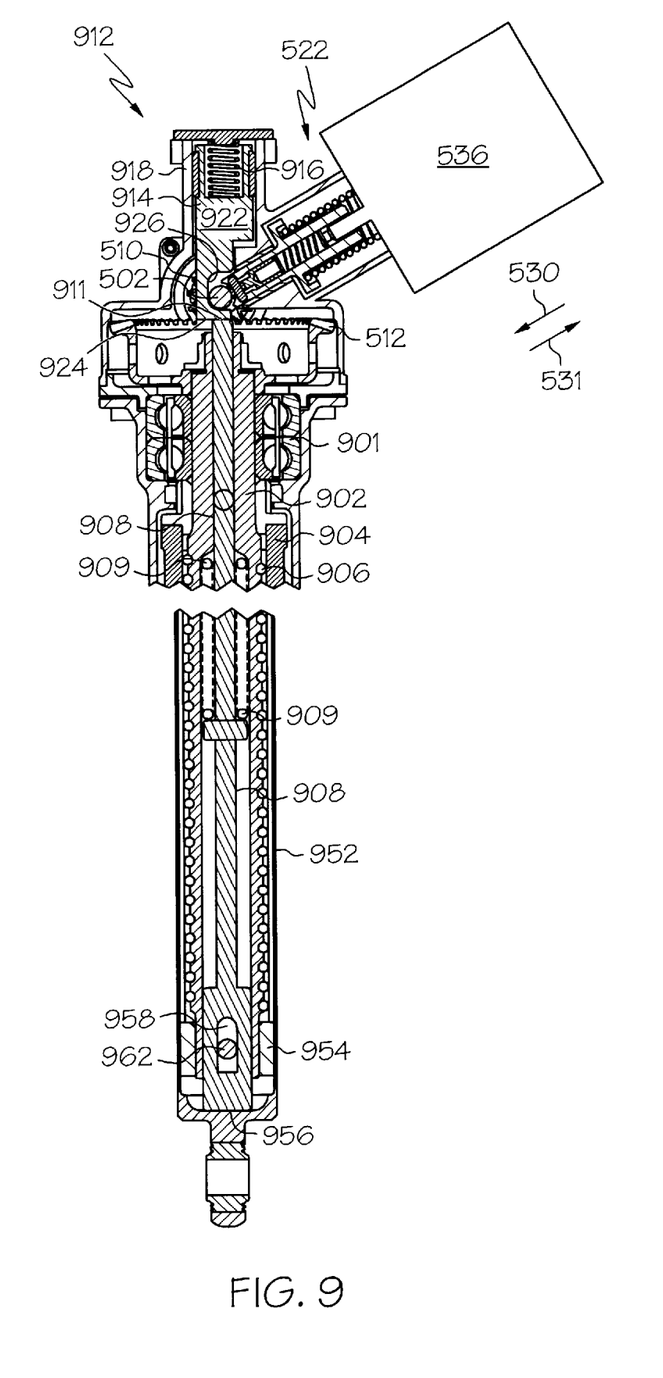
FIGS. 9 and 10 are partial cross section views the actuator assembly taken along line 9—9 in FIG. 5, showing the actuator assembly in a locked and unlocked configuration, respectively.
Figure 10:
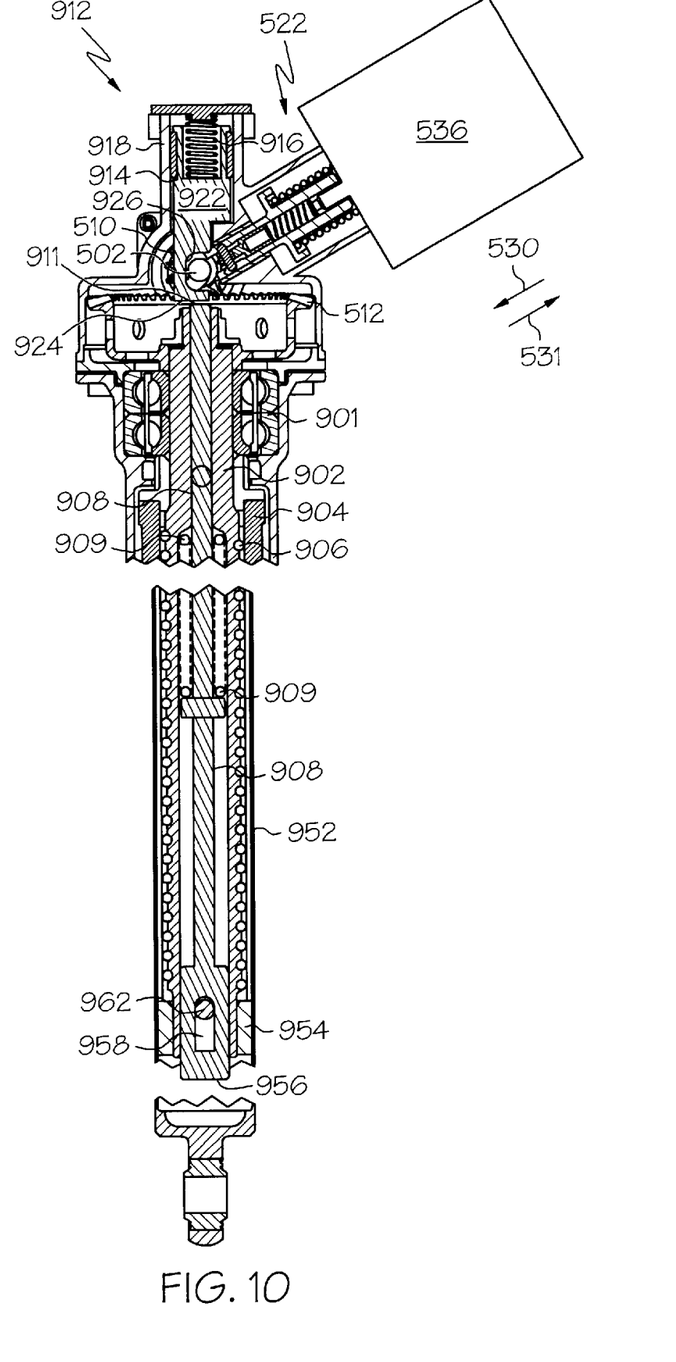

Turning now to FIGS. 9 and 10, which are cross section views of portions of an actuator assembly 210 taken along line 9—9 in FIG. 5, the remainder of the actuator assembly 210 will be described. As was previously noted, the gearing 510 on the drive shaft 502 meshes with the bevel gear 512. The bevel gear 512 is rotationally supported by a duplex bearing assembly 901 and is coupled to one end of a ballscrew shaft 902. A ball nut 904, which is rotationally supported on the ballscrew shaft 902 by a plurality of ball bearing assemblies 906, is attached to one of the transcowls 102 (not illustrated in FIGS. 9 and 10), via an extension tube 952 (see FIG. 10). Thus, rotation of the drive shaft 502 causes rotation of the ballscrew shaft 902, which results in translation of the ball nut 904, extension tube 952, and the transcowls 102. A dog stop 954 is coupled to an end of the ballscrew shaft 902. The dog stop 954 rotates with the ballscrew shaft 902, but does not translate, thereby limiting the translation of the ball nut 904 and extension tube 952.

A push rod 908 is mounted within, and extends trough, the ballscrew shaft 902. The push rod 908 has a first end 911 and a second end 956. A slot 958 is formed in the push rod 908 near the push rod second end 956. A pin 962, which is coupled to the dog stop 954, extends through the slot 958. As a result, the push rod 908 rotates with the ballscrew shaft 902. The slot 958 also allows the push rod 908 to translate a predetermined distance, based on the length of the slot 958. A spring 909, which is positioned within the ballscrew shaft 902 and surrounds a portion of the push rod 908, biases the push rod 908 toward the extension tube 952. Thus, when the actuator assembly 210 is in a stowed position, as shown in FIG. 9, the extension tube 952 contacts the push rod second end 956, and translates the push rod 908 against the bias of the spring 909. Conversely, when the actuator assembly is moved away from the stowed position, and toward a deployed position, the spring 909 biases the push rod 908 toward the extension tube 952. However, this translational movement, as was just noted, is limited by the slot 958.

The actuator assembly 210 additionally includes a lock inhibitor assembly 912. The lock inhibitor assembly 912 is coupled to the actuator housing 504, and includes a blocking link 914, and a biasing spring 916. The blocking link 914 is mounted within a housing 918, which may be an integral part of the actuator assembly housing 504 or a separate housing that is coupled to the actuator assembly housing 504. In the depicted embodiment, it is an integral part of the actuator assembly housing 504, but other configurations may be used as need for particular applications. The blocking link 912 is movably mounted within the lock inhibitor housing 918, and includes a main body 922 that extends into the actuator assembly housing 504, and is configured to surround at least a portion of the drive shaft 502. The blocking link 912 includes an end 924 that is positioned in generally opposed fashion to the push rod 908. The biasing spring 916 biases the blocking link main body 922 toward the push rod 908 such that, under certain circumstances, which are described in more detail below, the blocking link end 924 is in contact with the push rod 908. The blocking link 912 also includes an lock engagement section 926. The lock engagement section 926, as will additionally be described below, engages a portion of the locking device 522 when it is moved to the unlocked position 531 and the actuator assembly 210 is rotated in the deploy direction.

Having described the structure of the actuator assembly 210 and the general operation of the various components that make it up, a detailed description of the operation of the actuator assembly 210 will now be provided. It is noted that when the actuators are installed in a thrust reverser system, such as the one depicted in FIGS. 1–4, when the pilot commands the thrust reversers to deploy, the controller circuit 404 will energize the solenoids 536 on each actuator assembly 210 that includes a locking device 522. This will cause the rod 524 and locking bar 532 to move to the second, unlocked position 531. The controller circuit 404 will then energize the motors 402 to rotate the actuator assemblies 210 in the deploy direction. This rotation will cause the ball nut 904 and extension tube 952 to translate.

As the ball nut 904 and extension tube 952 begin translating, the spring 909 within the ballscrew shaft 902 moves the push rod 908 out of contact with the blocking link end 924. As a result, the blocking link biasing spring 916 moves the blocking link lock engagement section 926 into contact with the locking bar 532, or other portion of the locking device 522. The controller circuit 404 then de-energizes the solenoids 536. However, because of the contact between the blocking link engagement section 926 and the locking device 522, the locking device 522 is prevented from moving back to the first, locked position 530. This configuration is shown in FIG. 10. Actuator assembly rotation, and thus transcowl translation, continues until the cascade vanes 204 are uncovered. As was noted above, when this occurs a reverse thrust is produced to assist in slowing the aircraft.

When the thrust reversers are no longer needed, the pilot will command the thrust reversers to move to the stowed position. In response, the controller circuit 404 will energize the motors 402 to drive the actuator assemblies 210 in the stow direction. As the thrust reversers approach the stowed position, the extension tube 952 engages the push rod second end 956, and translates the push rod 908 and the push rod first end 911 toward the blocking link 914. As the push rod first end 911 continues translating, it contacts the blocking link end 924, translating it against the force of the blocking link biasing spring 916 and out of contact with the locking device 522. As a result, the rod 524 and locking bar 532 on each actuator assembly 210 having a locking device 522 are automatically moved, under the force of the biasing spring 528, to the first, unlocked position 530. With the rod 524 and locking bar 532 in the unlocked position 530, the drive shaft 502 will be able to continue rotating in the stow direction. However, rotation in the deploy direction is prevented.

Although the above embodiments have been depicted and described as including two protrusions 508 on the drive shaft 502, the invention is not limited to this number of protrusions. Rather, the actuator assembly 210 would operate as intended with only a single protrusion, or with more than two protrusions. Moreover, it will be appreciated that the invention is not limited to use of a locking bar 532 mounted to a rod 524. Indeed, the actuator assembly 210 may include only the rod 524 and one or more closely spaced protrusions 508 against which the rod 524 would abut to prevent the drive shaft 502 from rotating in the depoly direction.

As indicated previously, the present invention is not limited to use with a cascade-type thrust reverser system, but can be incorporated into other thrust reverser design types. Moreover, the present invention is not limited to use with an electric, electromechanical, or hydraulic thrust reverser actuation system. Indeed, the present invention can be incorporated into other actuation system designs, including pneumatic designs. In addition, the actuator assemblies may be used to move components other than thrust reverser components. For example, the actuator assemblies may be used to move flaps, and/or slats.

The actuator assembly 210 includes a lock inhibitor assembly 912 that holds the actuator locking device in the unlocked position when the actuator is moved toward the deploy position. Thus, the lock remains in the unlocked position even if an intermittent power loss occurs. In addition, actuator, lock inhibitor, and locking device are configured such that the actuator disengages the lock inhibitor when the actuator is moved into the stowed position, and as a result the locking device automatically moves to the locked position.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A system for moving a thrust reverser, comprising:
   at least one power source operable to supply a drive force;
   at least two drive mechanisms each coupled to receive the drive force; and
   at least two actuator assemblies, each actuator assembly coupled to at least one of the drive mechanisms and operable to move, upon receipt of the driving force, between a stowed position and a deployed position, at least one of the actuator assemblies having
      a housing,
      a drive shaft rotationally mounted within the housing, the drive shaft having a gear portion, a lock portion, and a first end adapted to couple to at least one of the drive mechanisms,
      an actuator extending from the housing and having a drive gear mounted to engage the gear portion of the drive shaft,
   a lock assembly movably mounted on the housing and selectively operable to move between a locked and an unlocked position, whereby the lock assembly engages and disengages the drive shaft lock portion in the locked and unlocked position, respectively, to thereby prevent and allow rotation thereof, respectively, and
   a lock inhibitor assembly mounted on the housing and selectively operable to move between an engaged and a disengaged position, whereby the lock inhibitor engages the lock assembly in the engaged position to thereby prevent movement thereof to the locked position.

2. The system of claim 1, wherein the lock inhibitor assembly disengages the lock assembly in the disengaged position to thereby allow movement thereof from the unlocked to the locked position.

3. The system of claim 1, further comprising:
   a lock spring coupled to the lock assembly and configured to bias the lock assembly toward the locked position.

4. The system of claim 1, further comprising:
   lock inhibitor spring coupled to the lock inhibitor assembly and configured to bias the lock inhibitor assembly toward the engaged position.

5. The system of claim 1, further comprising:
   a push rod movably mounted within the actuator and selectively operable to move between a first position and a second position, whereby the push rod engages and disengages the lock inhibitor assembly in the first and second position, respectively, to thereby move the lock inhibitor assembly between the engaged and disengaged position, respectively.

6. The system of claim 5, further comprising:
   a push rod spring coupled to the push rod and configured to bias the push rod toward the second position.

7. The system of claim 6, wherein the push rod includes at least a first end and a second end, and wherein the push rod further comprises:
   a slot formed in the push rod proximate the second end; and
   a pin coupled to the actuator and extending through the slot.

8. The system of claim 7, wherein:
   the actuator includes a coupling end configured to couple to the thrust reverser; and
   the actuator coupling end contacts the push rod second end, thereby moving the push rod from the second position to the first position.

9. The system of claim 1, wherein:
   the lock assembly has at least a side surface and a bottom surface; and
   the lock portion of the drive shaft has at least one protrusion extending radially outwardly, each protrusion having a stop surface positioned to engage the lock side surface when the lock assembly is in the locked position to prevent rotation of the drive shaft.

10. The system of claim 9, wherein the stop surface of each protrusion is positioned to not engage the lock side surface when the lock assembly is in the second position to allow rotation of the drive shaft.

11. The system of claim 1, wherein each power source is an electric motor.

12. The system of claim 1, further comprising:
    an electromechanical operating mechanism coupled to the lock assembly to move the lock assembly from the locked position to the unlocked position in response to receiving an electrical signal.

13. The system of claim 1, further comprising:
    a position sensor coupled to the housing and operable to sense the position of the lock assembly.

14. A thrust reverser actuator assembly for use in a system having at least one drive mechanism for moving a thrust reverser between deployed and stowed positions, the actuator assembly comprising:
    a housing;
    a drive shaft rotationally mounted within the housing, the drive shaft having a gear portion, a lock portion, and a first end adapted to couple to at least one of the drive mechanisms;
    an actuator extending from the housing and having a drive gear mounted to engage the gear portion of the drive shaft;

a lock assembly movably mounted on the housing and selectively operable to move between a locked and an unlocked position, whereby the lock assembly engages and disengages the drive shaft lock portion in the locked and unlocked position, respectively, to thereby prevent and allow rotation thereof, respectively; and a lock inhibitor assembly mounted on the housing and selectively operable to move between an engaged and a disengaged position, whereby the lock inhibitor engages the lock assembly in the engaged position to thereby prevent movement thereof to the locked position.

15. The system of claim 14, wherein the lock inhibitor assembly disengages the lock assembly in the disengaged position to thereby allow movement thereof from the unlocked to the locked position.

16. The actuator assembly of claim 14, further comprising:

a lock spring coupled to the lock assembly and configured to bias the lock assembly toward the locked position.

17. The actuator assembly of claim 14, further comprising:

lock inhibitor spring coupled to the lock inhibitor assembly and configured to bias the lock inhibitor assembly toward the engaged position.

18. The actuator assembly of claim 14, further comprising:

a push rod movably mounted within the actuator and selectively operable to move between a first position and a second position, whereby the push rod engages and disengages the lock inhibitor assembly in the first and second position, respectively, to thereby move the lock inhibitor assembly between the engaged and disengaged position, respectively.

19. The actuator assembly of claim 18, further comprising:

a push rod spring coupled to the push rod and configured to bias the push rod toward the second position.

20. The actuator assembly of claim 19, wherein the push rod includes at least a first end and a second end, and wherein the push rod further comprises:

a slot formed in the push rod proximate the second end; and a pin coupled to the actuator and extending through the slot.

21. The actuator assembly of claim 20, wherein:

the actuator includes a coupling end configured to couple to the thrust reverser; and the actuator coupling end contacts the push rod second end, thereby moving the push rod from the second position to the first position.

22. The actuator assembly of claim 14, wherein:

the lock has at least a side surface and a bottom surface; and the lock portion of the drive shall has at least one protrusion extending radially outwardly, each protrusion having a stop surface positioned to engage the lock side surface when the lock is in the locked position to prevent rotation of the drive shaft.

23. The actuator assembly of claim 22, wherein the stop surface of each protrusion is positioned to not engage the lock side surface when the lock is in the second position to allow rotation of the drive shaft.

24. The actuator assembly of claim 14, wherein each power source is an electric motor.

25. The actuator assembly of claim 14, further comprising:

an electromechanical operating mechanism coupled to the lock assembly to move the lock assembly from the locked position to the unlocked position in response to receiving an electrical signal.

26. The actuator assembly of claim 14, further comprising:

a position sensor coupled to the housing and operable to sense the position of the lock assembly.

* * * * *